(12) United States Patent
Viard et al.

(10) Patent No.: US 7,072,803 B2
(45) Date of Patent: Jul. 4, 2006

(54) DEVICE AND PROCESS FOR ACQUISITION OF MEASUREMENTS USING A DIGITAL COMMUNICATION BUS, PARTICULARLY USED DURING AIRCRAFT TESTS

(75) Inventors: Laurent Viard, Toulouse (FR); Gilles Freaud, Plaisance du Touch (FR); Pierre Perez, Plaisance du Touch (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/866,500

(22) Filed: Jun. 10, 2004

(65) Prior Publication Data

US 2004/0236886 A1 Nov. 25, 2004

Related U.S. Application Data

(62) Division of application No. 10/390,240, filed on Mar. 14, 2003, now Pat. No. 6,937,957.

(51) Int. Cl.
*G01D 3/00* (2006.01)

(52) U.S. Cl. .................. 702/190; 702/57; 702/127; 702/190; 370/489; 710/100; 710/110; 712/31

(58) Field of Classification Search .............. 702/47, 702/50, 57, 108, 117–118, 189; 370/489, 370/389; 710/110, 100; 712/31
See application file for complete search history.

(56) References Cited

U.S. PATENT DOCUMENTS

| | | |
|---|---|---|
| 4,850,047 A * | 7/1989 | Iguchi et al. ............. 398/60 |
| 5,255,267 A | 10/1993 | Hansen et al. |
| 5,473,599 A | 12/1995 | Li et al. |
| 5,721,737 A * | 2/1998 | Radjabi et al. ............. 370/449 |
| 5,982,191 A | 11/1999 | Starr |
| 6,013,108 A | 1/2000 | Karolys et al. |
| 6,069,899 A | 5/2000 | Foley ......................... 370/494 |
| 6,466,539 B1 * | 10/2002 | Kramer et al. ............. 370/216 |
| 6,731,691 B1 | 5/2004 | Agazzi et al. |
| 6,834,316 B1 * | 12/2004 | Ishida et al. .................. 710/62 |
| 2001/0036227 A1 | 11/2001 | Matsuo et al. ............. 375/224 |
| 2003/0128702 A1 | 7/2003 | Satoh et al. |

FOREIGN PATENT DOCUMENTS

EP 0 895 400 7/1998

* cited by examiner

*Primary Examiner*—Marc S. Hoff
*Assistant Examiner*—Elias Desta
(74) *Attorney, Agent, or Firm*—Thelen Reid & Priest LLP

(57) ABSTRACT

The invention relates to a device for acquisition of measurements using a digital communication bus (10) and a computer system. The device includes a bus arbitrator, several items of slave equipment, and two line termination devices. The bus arbitrator (11) is connected to the bus (10), with the function of acting as the bus master. The bus arbitrator synchronizes measurements made using sensors (14). The several items of slave equipment (13) are connected on the bus (10), to which these sensors (14) are connected. The first of the two line termination devices is integrated in the bus arbitrator (11) and the second is integrated into slave equipment (13) at the other end of the bus (10) opposite the bus arbitrator (11).

13 Claims, 3 Drawing Sheets

DEVICE AND PROCESS FOR ACQUISITION OF MEASUREMENTS USING A DIGITAL COMMUNICATION BUS, PARTICULARLY USED DURING AIRCRAFT TESTS

STATEMENT OF CROSS-RELATED APPLICATIONS

This application is a divisional application based on U.S. application Ser. No. 10/390,240, entitled "Device and Process For Acciuisition Of Measurements Using A Digital Communication bus, Particularly Used During Aircraft Tests" by Laurent Viard, Gilles Freaud and Pierre Perez, which was filed on Mar. 14, 2003 now U.S. Pat. No. 6,937,957 which claims priority based on French Patent Application No. 02 03217, entitled "Device and Process For Acquisition Of Measurements Using A Digital Communication bus, Particularly Used During Aircraft Tests" by Laurent Viard, Gilles Freaud and Pierre Perez, which was filed on Mar. 15, 2002, and which was not published in English.

TECHNICAL FIELD

This invention relates to a device and process for acquisition of measurements using a digital communication bus, particularly used during aircraft tests.

STATE OF PRIOR ART

A known method of acquiring measurements consists of using multiplexers receiving measurement signals from analog and/or digital sensors as input. These multiplexers digitize signals originating from analog sensors and format signals from digital sensors. Output signals from these multiplexers can then be sent to an acquisition computer.

In aeronautics, this type of output signal is frequently made according to the ARINC 429 standard. However, connections made using this standard only enable a limited throughput. Several connections then have to be made between each multiplexer and the acquisition computer. When the number of measurements made per unit time is large, it is frequent to use one link of this type for each multiplexer. The result is a very large volume of wiring, with the corresponding disadvantages in terms of cost, volume, weight, etc.

A person skilled in the art, faced with the need to reduce the wiring volume, may decide to use a digital communication bus between the multiplexers and the computer for the acquisition of measurements.

This could be a CAN bus (ISO standard 11898:1993 (E)) used in the automobile field. But there are several disadvantages with this type of bus that make it unsuitable for the envisaged application of acquiring measurements during aircraft tests:
  it is not synchronous and therefore cannot be used to make measurements using different sensors at the same times,
  its maximum throughput (1 Mbit/s) is not sufficiently high for the envisaged application and the maximum length of the connections is insufficient; the routing of connections in an aircraft can be as long as or longer than a hundred meters.

This bus could be a FIP bus (NFC46-602, NFC46-603, NFC46-604 standards) or the WorldFIP bus derivative of it (EN50170 standard—volume 3), used in the industrial logic controllers field. This type of bus has a deterministic nature (possibility of synchronizing measurements from different sensors), but it requires the use of specific large components which have the following disadvantages:
  these components can cause integration problems in aircraft equipment,
  these components are only available in "commercial" temperature ranges, whereas the position of some multiplexers (for example close to engine areas) requires the use of components that can operate at higher temperatures (up to 105° C.),
  their maximum throughput of 2.5 Mbit/s is not always enough to transmit all the measurements made.

Furthermore, a FIP bus of this type is intended to be sufficiently universal to federate different types of equipment (logic controllers, speed variators, etc.). The protocol used is thus fairly complex and therefore requires the exchange of a large volume of information on the bus, which is a problem in itself when the "useful" data volume itself is high, as is the case for cyclic measurement acquisitions.

The purpose of the invention is to propose a device and a method for acquisition of measurements using a digital communication bus to overcome the disadvantages mentioned above.

PRESENTATION OF THE INVENTION

The purpose of the invention is a device for acquisition of measurements using a digital communication bus and a computer system characterized in that it comprises:
  a bus arbitrator connected to this bus, with the function of acting as the bus master and which synchronizes measurements made using sensors,
  several items of slave equipment connected on this bus, to which these sensors are connected,
  two line termination devices; the first being integrated in the bus arbitrator and the second being integrated into slave equipment at the end of the bus opposite the bus arbitrator.

The said device may also comprise at least one intelligent sensor comprising at least one measurement channel connected directly to the bus.

Advantageously, the bus is composed of a cable with two shielded twisted pairs:
  a first pair being used for data exchanges between the bus arbitrator and slave equipment,
  a second pair being used for transporting a data validation clock.

The bus is split into several segments, the ends of which are connected to the slave equipment connectors, one end of one of the segments being connected to the bus arbitrator, the interconnections between these various segments and the connection lines between the slave equipment and the bus being made within the slave equipment.

A junction element can replace slave equipment, the connection of this element being compatible with the connection of the slave equipment to guarantee continuity of the bus and the bus shielding.

Slave equipment may be composed of two types of multiplexers:
  multiplexers of a first type, each of which receives 16 analog input channels,
  multiplexers of a second type, each of which receives 32 analog inputs.

Another purpose of the invention is a process for the acquisition of measurements using a digital communication bus, a computer system, a bus arbitrator connected to this bus which acts as bus master and which synchronizes measurements made using sensors, and several items of slave equipment connected to this bus to which these sensors are connected, characterized in that the bus arbitrator uses a cyclic exchange of variables to acquire measurements from sensors through the slave equipment.

Advantageously, the bus arbitrator comprises a scanning table composed of an ordered sequence of identifiers of variables to be queried during an elementary data scanning cycle. This table is fixed and unchangeable. This table comprises two parts; a first part related to the acquisition of measurements, a second part related to the acquisition of status variables of the different slave equipment.

In another operating mode, the bus arbitrator uses a non-periodic exchange of variables to make data transfers either from the said bus arbitrator to the slave equipment, or from slave equipment to the said bus arbitrator. The bus arbitrator orders circulation of a start download/remote read data transfer identification frame to trigger the data transfer.

When transferring download data only, the slave equipment that receives the data begins by acknowledging the received identification frame. The next step is an exchange of data sent by the bus arbitrator (download) or by the sending slave equipment (remote read), with an acknowledgement of each exchange by the data receiver.

For a transfer of download data, the bus arbitrator terminates the exchange by sending an end of transaction indication frame that is acknowledged by the slave equipment concerned.

For a transfer of remote read data, the sending slave equipment indicates the end of the exchange by sending an end of transaction indication frame to the bus arbitrator.

Advantageously, the said measurement acquisition device may be used during tests on an aircraft.

The use of a digital communication bus like that described above has the advantage that no special components are necessary; the physical layer is made by means of "driver" circuits for RS485 type connections; the link layer and the application layer use programmable components (DSP or micro controller, FPGA). These various components are available for temperature ranges compatible with the envisaged application.

DETAILED PRESENTATION OF EMBODIMENTS

The following description defines physical layer and data link layer elements for a digital communication bus dedicated to information exchange between sensors and/or sensor multiplexers and a computer acquisition system, according to the ISO model.

The Open Systems Interconnection Basic Reference Model, simply called the ISO model (ISO standard 7498—Part 1) is an abstract reference model used to create interconnection and cooperation standards between distributed systems.

This model defines an architecture consisting of several layers applicable for all network categories in which:

the physical layer is used for the transmission of the bits in a data block. It specifies the mechanical, electrical and functional rules and procedures related to data circuits (one data circuit is formed by a communication line and by the means necessary to transmit information on the line). It provides means of setting up a physical connection between two items of equipment, maintaining this connection during exchanges and releasing it at the end of exchanges.

the data link layer was initially introduced to overcome problems created by data circuits. These data circuits used to transmit bits are sensitive to noise (attenuation, phase distortion, parasites, etc.) and have an error rate that is unacceptable to users who operate the interconnected elements. The role of the data link layer is to set up logical connections between entities that would like to exchange data. Logical connections offered by the data link level are error free. At this level, data are organized in the form of frames. Transmission errors and frame loss and duplication problems are handled by the data link layer.

Figure 1:
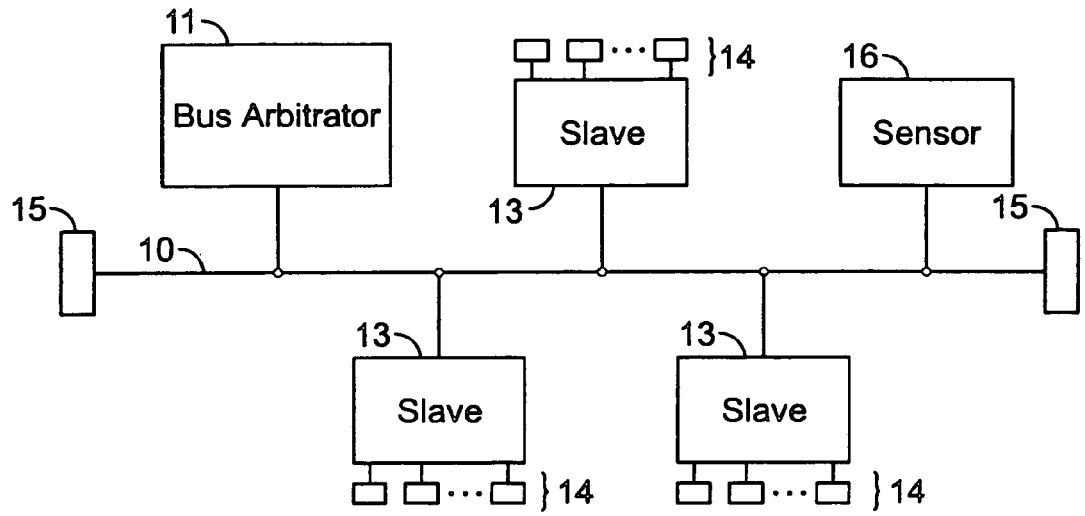
FIG. 1 illustrates a measurement acquisition device with an architecture based on a digital communication bus for application of the process according to the invention.

As illustrated in FIG. 1, the measurement acquisition device according to the invention is structured around a digital communication bus 10 on which a bus arbitrator 11 is connected to act as the bus master, together with a number of slave equipments 13 to which sensors 14 are connected; the computer system used is well known to a person skilled in the art and is not shown.

As shown in this FIG. 1, intelligent sensors 16 may be connected directly onto the digital communication bus 10. These types of intelligent sensors 16 may comprise one measurement channel (for example temperature, pressure, etc.), or several measurement channels integrated in the same sensor; for example a first pressure or relative humidity measurement, plus a temperature measurement to correct the said first measurement.

Throughout the remainder of the description, the term "slave equipment 13" will be used to denote slave items of equipment 13 themselves together with the intelligent sensors 16.

Physical Layer

Physically, this digital communication bus 10 is connected in a known manner according to the RS485 standard. It thus comprises line termination devices 15 composed of impedances with values of 120 ohms.

This bus 10 is composed of a cable with two shielded twisted pairs (2p):

a first pair used to exchange data between the bus arbitrator 11 and slave equipment 13, a second pair used for transport of a data validation clock.

The shielding in this cable is made continuous throughout its length. Each shielding at each slave equipment 13 is connected to the mechanical ground through a capacitor. The shielding is connected directly to the mechanical ground at the bus arbitrator 11.

Pull-up and pull-down resistances at the bus arbitrator 11 are used to fix the voltages on the data and clock lines or pairs for the high impedance status. The value of these resistances is 390 ohms.

The configuration of the bus 10 is such that there is a single path between all equipment 11 and 13 dialoging on this bus. There must not be a closed loop.

Figure 2A:
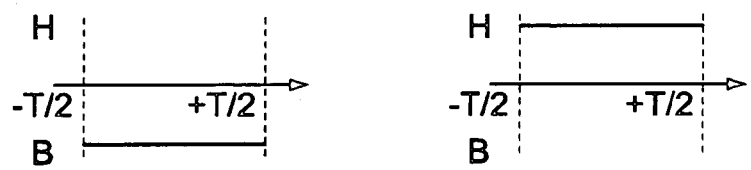
FIG. 2 illustrates the clock and data signals used in the device in FIG. 1.

Data transmitted on this bus 10 are encoded in the NRZ (non return to zero) format as shown in FIG. 2A:

a logical "1" corresponds to a high (H) physical level, a logical "0" corresponds to a low (B) physical level.

Figure 2B:
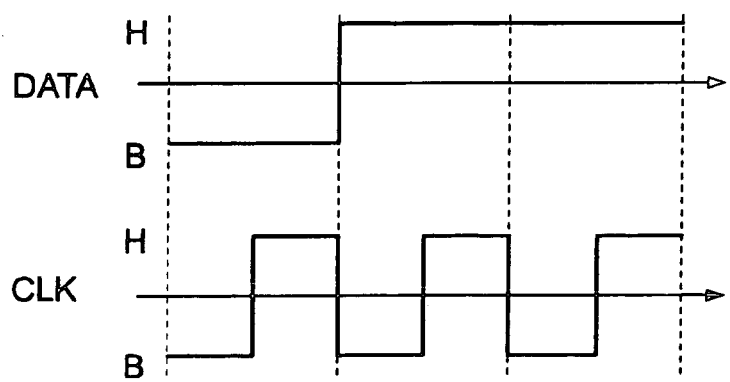

As shown in FIG. 2B, the data (DATA) sent on the first cable pair are accompanied by a clock (CLK) emitted on the second pair. This clock, sent on the second pair, validates the data simultaneously transmitted on the first pair at its rising front.

When no data are being sent on the bus, the two clock and data lines are in the "high impedance" status which corresponds to a logical "1" due to the presence of the above mentioned pull-up and pull-down resistances.

Figure 3:
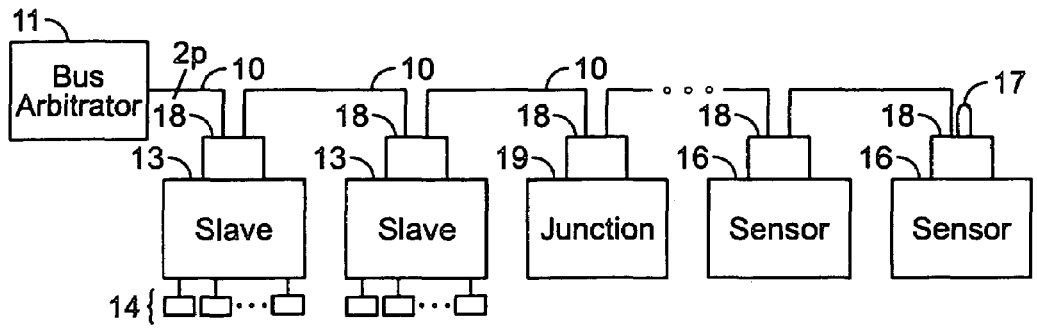
FIG. 3 illustrates an embodiment of the device according to the invention.

In the embodiment of the device according to the invention illustrated in FIG. 3, which facilitates the installation (cables, connections) of the bus, one of the two line termination devices 15 is integrated into the bus arbitrator 11, and the other line termination device is integrated into the slave equipment 13 at the other end of the bus 10.

To achieve this, each item of slave equipment 13 comprises a resistance with an appropriate value (120 ohms) that can be connected to the bus 10 using at least one shunt 17 connected to the connector 18 on the slave equipment considered.

As illustrated in FIG. 3, the bus 10 is advantageously split into several segments, the ends of which are connected to the connectors 18 of the slave equipment 13 or the sensors 16, one end of one of the segments, for example the first segment, being connected to the bus arbitrator 11. Interconnections between these different segments and the connection lines or stubs between slave equipment 13 and the bus 10, are made inside slave equipment 13, which minimizes and fixes the length of the stubs. The result is that these stubs cannot become sources for reflections of bus signals and therefore sources of disturbances of data exchanges.

If slave equipment 13 has to be removed from the bus 10, it can be replaced by a junction element 19 which has connections compatible with it, to achieve continuity between the two pairs of the cable and its shielding.

Data Link Layer

The device according to the invention described above has two operating modes:

a first operating mode in which the bus arbitrator 11 acquires measurements originating from sensors 14 through slave equipment 13, through a cyclic exchange of variables, a second operating mode in which the bus arbitrator 11 makes data transfers either from the said bus arbitrator 11 to the slave equipment 13 (download), or from slave equipment 13 to the bus arbitrator 11 (remote read), the transfers made according to the second mode being non-periodic. For example, data transmitted during these transfers may relate to settings or programming of slave equipment 13.

In the first embodiment, the bus arbitrator 11 comprises a scanning table composed of an ordered sequence of identifiers of variables to be queried during an elementary data scanning cycle, as shown in table 1 at the end of the description. This table is fixed and unchangeable, regardless of the slave equipment 13 being present or absent on the bus 10.

This table comprises two parts:

a first part related to acquisition of measurements, for example in increasing order of the numbers of slave equipment 13 and variable addresses, produced for a given slave equipment, (for example measurements 1, measurements 2), a second part related to acquisition of status variables from the different slave equipment 13, for example in increasing order of the numbers of slave equipment 13.

The size of this table may initially be fixed arbitrarily.

In the second operating mode, the bus arbitrator 11 causes circulation of a start download/remote read data transfer identification frame to initiate the data transfer.

In the case of download data transfer only, the slave equipment 13 that is recognized as the recipient of the data begins by acknowledging the received identification frame. A data exchange follows, sent by the bus arbitrator 11 (download) or by the sending slave equipment 13 (remote read), with acknowledgement of each exchange by the data receiver.

In the case of a download data transfer, the bus arbitrator 11 terminates the exchange by sending an end of transaction indication frame acknowledged by the slave equipment concerned.

In the case of a remote read data transfer, the sending slave equipment 13 indicates the end of the exchange by returning an end of transaction indication frame to the bus arbitrator 11.

Figure 4:
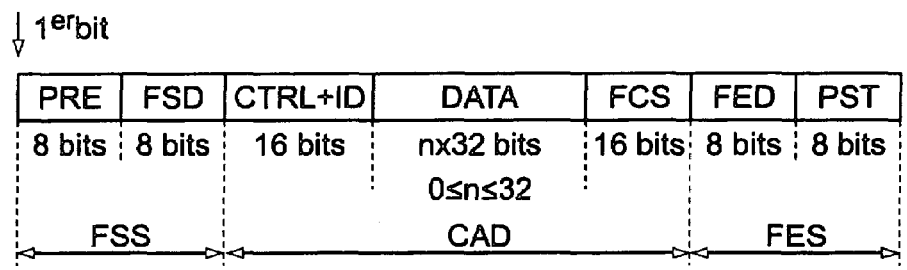
FIG. 4 illustrates the communication protocol used in the device according to the invention.

The communication protocol used between the bus arbitrator 11 and the slave equipment 13 is based on an exchange of information frames like that shown in FIG. 4.

The meaning of the abbreviations shown in this figure are as follows:

| | |
|---|---|
| FSS: | Frame Start Sequence |
| PRE: | PREamble |
| FSD: | Frame Start Delimiter |
| CAD: | Control And Data |
| CTRL + ID: | ConTRoL + IDentifier (ID) |
| DATA: | Data |
| FCS: | Frame Check Sequence |
| FES: | Frame End Sequence |
| FED: | Frame End Delimiter |
| PST: | PoSTamble |

Therefore, each frame comprises a frame start identification sequence (FSS), a control field (CTRL+ID) indicating the nature of the frame (cyclic variable read, download, remote read, etc.) and the variable concerned, a data area (DATA), a transmission error check code (FCS), and a frame end identification sequence (FES).

The error check code (FCS) is calculated by applying a polynomial such as for example $X^{16}+X^{12}+X^{11}+X^{10}+X^{8}+X^{7}+X^{6}+X^{3}+X^{2}+X+1$, (DATA) fields, and then complementing the 16-bit word thus obtained.

If there is a difference between the error check code FCS received and the error check code FCS recalculated by the frame recipient, it is considered that this frame is lost. Loss of a frame related to cyclically exchanged variables is usually not very serious because the value of the variable is distributed again during the next scanning cycle.

Figure 5A:
FIG. 5 illustrates the CTRL+ID check field for a frame of the communication protocol used in the device according to the invention.

As illustrated in FIG. 5A, the CTRL+ID field is composed of two parts:

a "check" part that indicates the nature of the frame; for a frame sent by the bus arbitrator, the bits considered specify the current exchange type; possible values are illustrated in table 2. For a response frame, these bits indicate the current exchange type; possible values are illustrated in table 3.

an "identifier" part itself subdivided into two fields:
subscriber address (or slave equivalent),
variable address.

Figure 5B:
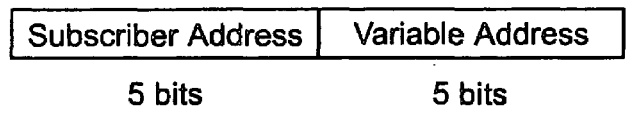

Variable identifiers are illustrated in FIG. 5B. Download/remote read data identifiers are illustrated in FIG. 5C.

Figure 5C:
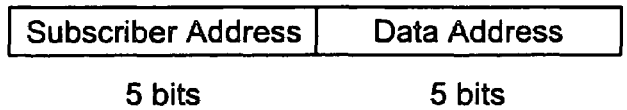

The number of bits indicated in FIGS. 5A, 5B and 5C are applicable for one possible embodiment.

The "identifier" part is used to specify which variable of which slave equipment 13 is to be read or written. A subscriber address equal to zero can be used to simultaneously address all slave equipment 13. This function is used particularly to send synchronization pulses to all slave equipment 13 for the acquisition of measurements from sensors at the same instant on each slave equipment 13 with a small time error margin.

The length of the data (DATA) field is fixed when the device is designed. It may be equal to three values depending on the frame type:

a first value related to the first operating mode, corresponding to a query frame for slave equipment 13 by the bus arbitrator 11 depending on the variables scanning table, a second value related to the first operating mode corresponding to a frame containing variables (measurements and/or status) returned by slave equipment 13 following a query by the bus arbitrator 11, and a third value related to the second operating mode, corresponding to a download/remote read frame.

Example Embodiment of the Invention

Figure 6:
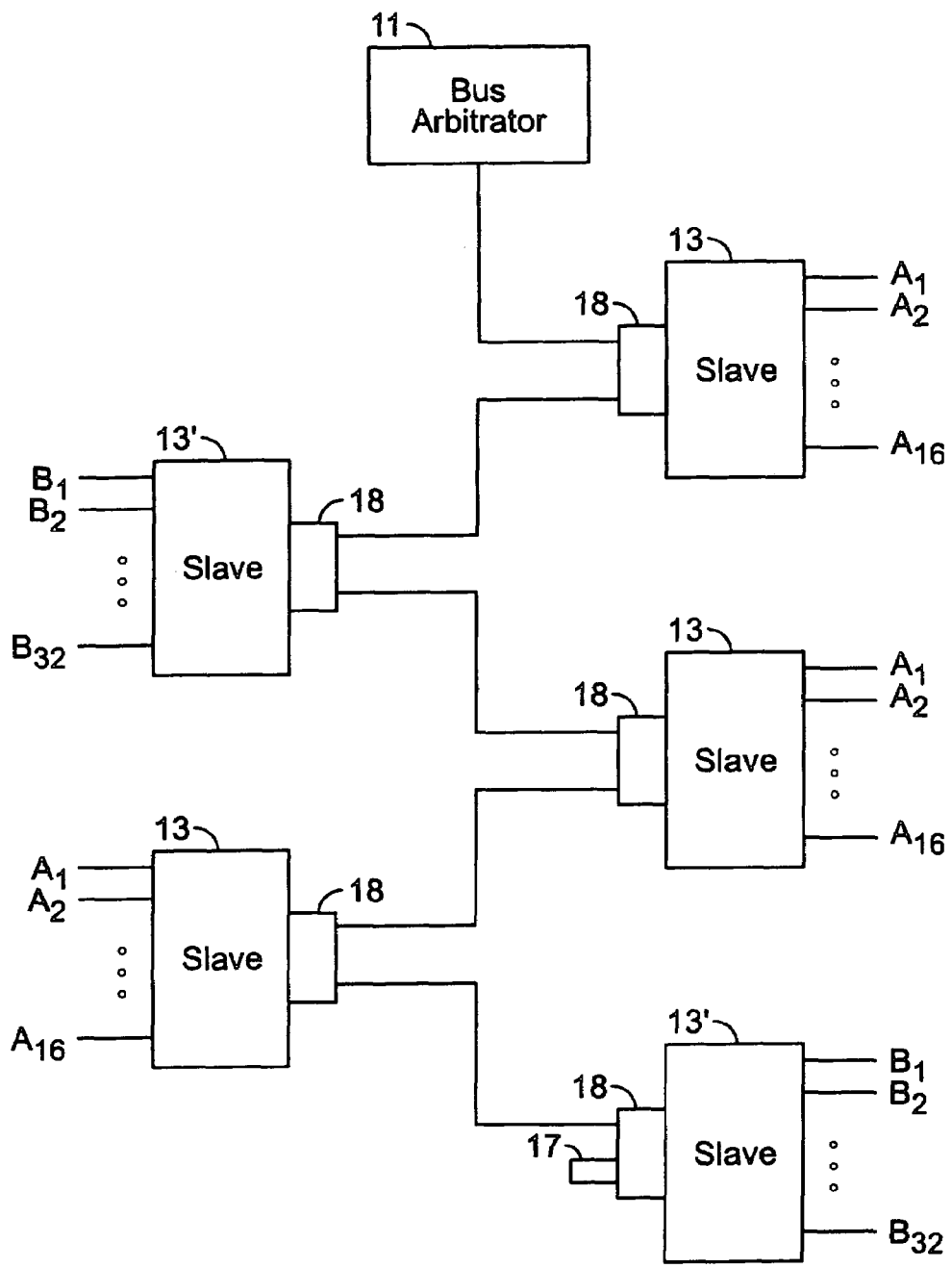
FIG. 6 illustrates an example embodiment of the invention.

In one example embodiment illustrated in FIG. 6, the device according to the invention comprises not more than 16 (for example 5) slave units 13. The length of the bus 10 is less than or equal to 100 meters. Equipment 11 and 13 connected to the bus 10 communicate at a rate of 4.167 Mbits/s. The variable scanning frequency is equal to 128 samples per second.

Slave equipment is composed of two types of multiplexers:

a first type of multiplexers 13, each of which receives 16 analogue input channels A1n . . . A16, for example strain gauges, temperature or voltage probes, a second type of multiplexers 13', each of which receives 32 analogue inputs B1 . . . B32, for example temperature probes.

Before the beginning of a scanning cycle, the bus arbitrator 11 sends a synchronization frame to all slave multiplexers 13 and 13' so that they can acquire data at approximately the same moment.

Furthermore, the bus arbitrator 11 sends a frame twice a second corresponding to another type of synchronization which has the effect of initializing start up of onboard software in this multiplexer immediately after one of the said multiplexers has started, so that this software is executed approximately synchronously with the execution of software onboard the computer system controlling the acquisition of measurements through the bus arbitrator and onboard the other multiplexers connected to the same communication bus.

The use of the said synchronization frames is a means of obtaining a maximum value of the phase shift (time difference between the measurements from any two sensors) less than 0.1°.

The frame length is fixed when the system is designed. The DATA field contains 0 byte in the case of query frames to slave equipment 13 sent by the bus arbitrator 11, 36 bytes in the case of variable return frames sent from slave equipment 13, and 128 bytes in the case of download/remote read frames. If the number of bytes is greater than the volume of data to be transmitted, unused bytes are fixed at an arbitrary value (for example equal to zero).

TABLE 1

| Subscriber physical address | Variable produced | Identification code |
| --- | --- | --- |
| 1 | Measurements 1 | Code 1 |
| 1 | Measurements 2 | Code 2 |
| 2 | Measurements 1 | Code 3 |
| 2 | Measurements 2 | Code 4 |
| 3 | Measurements 1 | Code 5 |
| . | . | . |
| . | . | . |
| . | . | . |
| 16 | Measurements 1 | Code 31 |
| 16 | Measurements 2 | Code 32 |
| 1 | Status | Code 33 |
| 2 | Status | Code 34 |
| . | . | . . . |
| . | . | |
| . | . | |
| 16 | Status | Code 48 |

TABLE 2

| 5 | 4 | 3 | 2 | 1 | 0 | |
| --- | --- | --- | --- | --- | --- | --- |
| | | | | | | Identification frame |
| 0 | 0 | 0 | 0 | 0 | 1 | Identified variable medium allocation |
| 0 | 0 | 0 | 1 | 0 | 0 | Start transfer of download data |
| 0 | 0 | 1 | 1 | 0 | 0 | End transfer of download data |
| 0 | 0 | 0 | 1 | 1 | 0 | Start transfer of remote read data |
| 0 | 1 | 0 | 1 | 1 | 1 | Positive acknowledgement transfer of remote read data |

TABLE 3

| 5 | 4 | 3 | 2 | 1 | 0 | |
| --- | --- | --- | --- | --- | --- | --- |
| | | | | | | Response frame |
| 1 | 0 | 0 | 0 | 0 | 1 | Identified variable response |
| 1 | 1 | 0 | 1 | 0 | 0 | Positive acknowledgement start of download data transfer |
| 1 | 0 | 0 | 1 | 0 | 0 | Negative acknowledgement start of download data transfer |
| 1 | 1 | 0 | 1 | 0 | 1 | Positive acknowledgement download data transfer |
| 1 | 1 | 1 | 1 | 0 | 0 | Positive acknowledgement end of download data transfer |
| 1 | 0 | 1 | 1 | 0 | 0 | Negative acknowledgement end of download data transfer |
| 1 | 1 | 0 | 1 | 1 | 1 | Transfer of remote read data |
| 1 | 1 | 1 | 1 | 1 | 1 | End transfer of remote read data |

The invention claimed is:

1. A process for the acquisition of measurements using a digital communication bus, a computer system, a bus arbitrator connected to this bus which acts as bus master and which synchronizes measurements made using sensors, and several items of slave equipment connected to this bus to which these sensors are connected, comprising:
   obtaining a seciuence of identifiers of variables for a scanning cycle from a fixed and unchangeable scanning table located in the bus arbitrator;
   scanning measurements by the sensors in accordance with the scanning cycle; and
   acquiring the measurements from the sensors through the slave equipment in response to the sequence of the identifiers of variables.

2. Process according to claim 1, in which the scanning table comprises an ordered sequence of identifiers of variables to be queried during an elementary data scanning cycle.

3. Process according to claim 2, wherein scanning measurements further includes detecting analog signals from analog input channels of the slave equipments.

4. Process according to claim 3, wherein the obtaining a sequence of identifiers of variables for a scanning cycle from a fixed and unchangeable scanning table further includes identifying a first part related to the acquisition of measurements and a second part related to the acquisition of status variables of the different slave equipment.

5. Process according to claim 1, in which the bus arbitrator uses a non-periodic exchange of variables to make data transfers either from the bus arbitrator to the slave equipment, or from slave equipment to the bus arbitrator.

6. Process according to claim 5, in which the bus arbitrator orders the circulation of a start download/remote read data transfer identification frame to trigger the data transfer.

7. Process according to claim 6, in which, in the case of a transfer of download data only, the slave equipment that receives the data begins by acknowledging the received identification frame, and is then followed by an exchange of data sent by the bus arbitrator (download) or by the sending slave equipment (remote read), with an acknowledgement of each exchange by the data receiver.

8. Process according to claim 7, in which, in the case of a transfer of download data, the bus arbitrator terminates the exchange by sending an end of transaction indication frame that is acknowledged by the slave equipment concerned.

9. Process according to claim 6, in which, in the case of a transfer of remote read data, the sending slave equipment indicates the end of the exchange by sending an end of transaction indication frame to the bus arbitrator.

10. The process according to claim 1 wherein the slave equipment includes at least one multiplexer.

11. The process according to claim 10 further comprising:
   periodically sending a synchronization frame from the bus arbitrator to synchronize with the computer system, immediately after said at least one multiplexer has started.

12. The process according to claim 10 further comprising:
   periodically sending a synchronizing frame from the bus arbitrator to synchronize with other multiplexers from other slave equipments, immediately after said at least one multiplexer has started.

13. The process according to claim 10 further comprising:
   periodically sending a synchronization frame from the bus arbitrator to all multiplexers, before the beginning of the scanning cycle.

* * * * *